United States Patent
Lin et al.

(10) Patent No.: US 10,310,191 B2
(45) Date of Patent: Jun. 4, 2019

(54) CONNECTOR ASSEMBLY WITH CLEANING DEVICES

(71) Applicant: FOXCONN INTERCONNECT TECHNOLOGY LIMITED, Grand Cayman (KY)

(72) Inventors: Nan-Hung Lin, New Taipei (TW); Chun-Yi Chang, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 155 days.

(21) Appl. No.: 15/369,807

(22) Filed: Dec. 5, 2016

(65) Prior Publication Data

US 2017/0160493 A1    Jun. 8, 2017

Related U.S. Application Data

(60) Provisional application No. 62/263,577, filed on Dec. 4, 2015.

(51) Int. Cl.
| | |
|---|---|
| *G02B 6/38* | (2006.01) |
| *H01R 13/52* | (2006.01) |
| *H01R 43/00* | (2006.01) |

(52) U.S. Cl.
CPC ........... *G02B 6/3866* (2013.01); *H01R 13/52* (2013.01); *H01R 43/002* (2013.01)

(58) Field of Classification Search
CPC ..... G02B 6/3866; H01R 13/52; H01R 43/002
See application file for complete search history.

(56) References Cited

U.S. PATENT DOCUMENTS

| 4,708,432 | A | * | 11/1987 | Berg | B08B 1/00 |
| | | | | | 385/73 |
| 5,025,526 | A | * | 6/1991 | Ichitsubo | H01R 43/002 |
| | | | | | 15/118 |
| 5,243,730 | A | * | 9/1993 | Ichitsubo | H01R 43/002 |
| | | | | | 15/118 |
| 6,047,716 | A | * | 4/2000 | Shimoji | B08B 1/00 |
| | | | | | 134/166 C |
| 9,885,839 | B2 | * | 2/2018 | Watte | G02B 6/3866 |
| 9,939,590 | B2 | * | 4/2018 | Gatnau Navarro | G02B 6/3866 |
| 2002/0006261 | A1 | * | 1/2002 | Krow, Jr. | G02B 6/3807 |
| | | | | | 385/134 |

(Continued)

*Primary Examiner* — Thomas A Hollweg
*Assistant Examiner* — Mary A El-Shammaa
(74) *Attorney, Agent, or Firm* — Wei Te Chung; Ming Chieh Chang

(57) ABSTRACT

A connector assembly includes a first connector and a second connector mating with the first connector. The first connector defines a first mating face, a first cleaning device disposed in the first mating face and a stiff first mating portion exposed upon the first mating face. The second connector defines a second mating face, a second cleaning device disposed in the second mating face and a stiff second mating portion exposed upon the second mating face. During mating the first connector to the second connector along the mating direction, the first cleaning device wipes the second mating face for wiping away the dirty attached to the second mating portion while the second cleaning device wipes the first mating face for wiping away the dirty attached to the first mating portion until the first and second mating portions mated with each other.

20 Claims, 19 Drawing Sheets

(56) References Cited

U.S. PATENT DOCUMENTS

| | | | | |
|---|---|---|---|---|
| 2002/0166190 | A1* | 11/2002 | Miyake | B08B 1/00 15/210.1 |
| 2003/0202752 | A1* | 10/2003 | Gall | G02B 6/32 385/61 |
| 2003/0221710 | A1* | 12/2003 | Young | B08B 1/00 134/22.14 |
| 2010/0199477 | A1* | 8/2010 | Mercado | G02B 6/3849 29/278 |
| 2012/0082417 | A1* | 4/2012 | Stanley | G02B 6/3866 385/77 |
| 2012/0216829 | A1* | 8/2012 | Cunningham | B08B 1/008 134/6 |
| 2014/0259480 | A1* | 9/2014 | Kida | G02B 6/3866 15/101 |
| 2014/0259744 | A1* | 9/2014 | Cooper | A43B 3/0057 36/28 |
| 2015/0029495 | A1* | 1/2015 | Leigh | B08B 5/02 356/73.1 |
| 2015/0253516 | A1* | 9/2015 | Miura | G02B 6/3866 348/143 |
| 2015/0362681 | A1* | 12/2015 | Watte | G02B 6/3866 385/58 |
| 2016/0306123 | A1* | 10/2016 | Gatnau Navarro | G02B 6/3825 |

\* cited by examiner

CONNECTOR ASSEMBLY WITH CLEANING DEVICES

BACKGROUND OF THE INVENTION

1. Field of the Invention

The present invention relates generally to a connector assembly, and more particularly to a connector assembly including a first connector having a first cleaning device and a second connector mating with the first connector and having a second cleaning device thereof, the first cleaning device wipes a mating portion of the second connector while the second cleaning device wipes a mating portion of the first connector during the first connector mating with the second connector for getting a reliable signal transmission therebetween.

2. Description of Related Arts

The traditional electrical connector assembly usually includes an electrical connector and a complementary plug connector mating with the electrical connector. First terminals defined in the electrical connector usually mechanically contact with second terminals defined in the complementary plug connector to make electrically connection between the electrical connector and the plug connector, and it is necessary to keep mating portions of both the electrical connector and the plug connector clear for ensuring signal transmission therebetween. In some designs, the first terminals each may scrape a corresponding second terminal to scrape off the dirty while mating, which can get a reliable mechanically and electrically connection between the electrical connector and the plug connector.

There is another type of connector assembly which mate in a non-contact manner, such as an optical connector assembly. It is also necessary to keep optical elements of the optical connector assembly clear and is important to ensure that there is no any scratch left on the optical elements after the optical elements being cleared. A dust-proof cover is popularly used in traditional optical connector assembly for preventing dust or other contaminants from attaching to the optical elements, however, the optical elements is covered by the dust-proof cover, which makes the check of the optical elements being difficult.

A connector assembly with cleaning devices for wiping mating portions is desired.

SUMMARY OF THE INVENTION

Accordingly, an object of the present invention is to provide a connector assembly which includes a first connector having a first cleaning device and a second connector having a second cleaning device, and during the first connector mating with the second connector, the first cleaning device cleans a mating portion of the second connector while the second cleaning device cleans a mating portion of the first connector.

To achieve the above object, a connector assembly includes a first connector and a second connector mating with the first connector in a mating direction for signal transmission, the first connector defines a first mating face, a first cleaning device disposed in the first mating face and a stiff first mating portion exposed upon the first mating face and located behind the first cleaning device in the mating direction. The second connector defines a second mating face, a second cleaning device disposed in the second mating face and a stiff second mating portion exposed upon the second mating face and located in front of the second cleaning device in the mating direction. During mating the first connector to the second connector along the mating direction, the first cleaning device wipes the second mating face for wiping away the dirty attached to the second mating portion while the second cleaning device wipes the first mating face for wiping away the dirty attached to the first mating portion until the first and second mating portions mated with each other.

DETAILED DESCRIPTION OF THE PREFERRED EMBODIMENT

Figure 1:
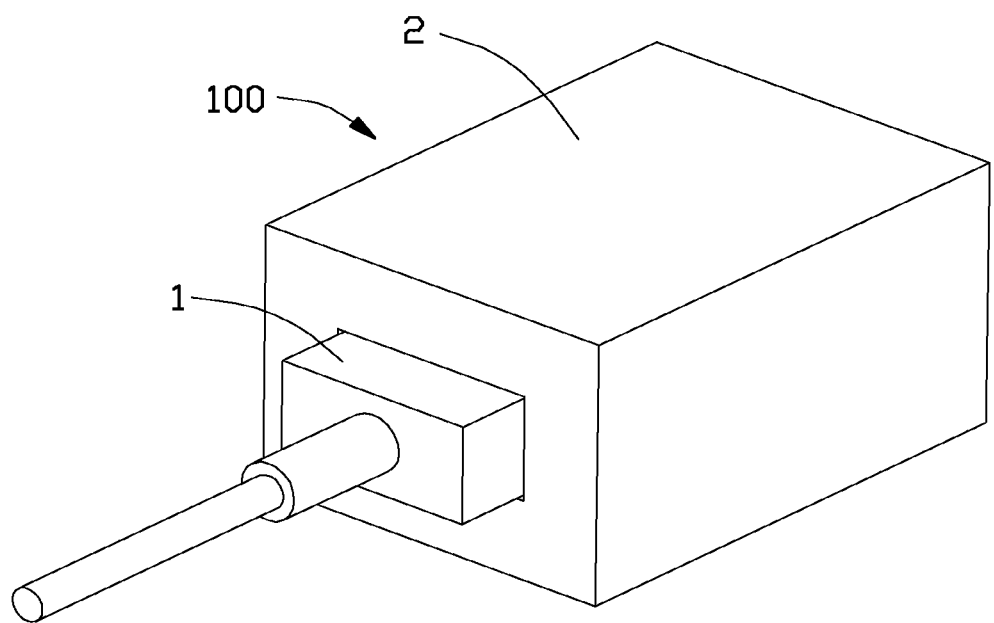
FIG. 1 is a front assembled perspective view of a preferred embodiment of a connector assembly according to the invention and showing a first connector and a second connector mated with each other.
Figure 2:
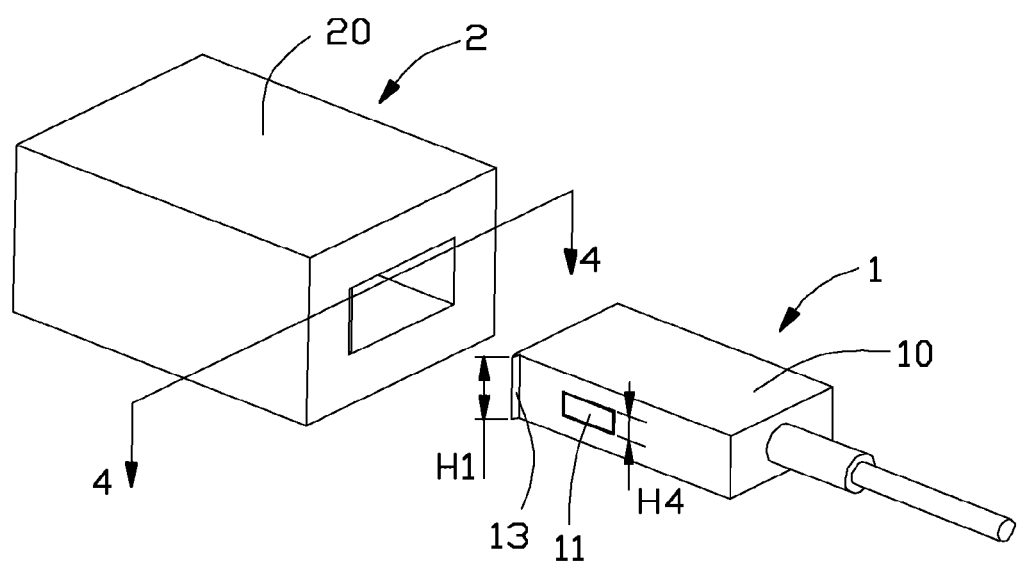
FIG. 2 is another perspective view of the connector assembly of FIG. 1, showing the first and second connectors separated from each other.
Figure 3:
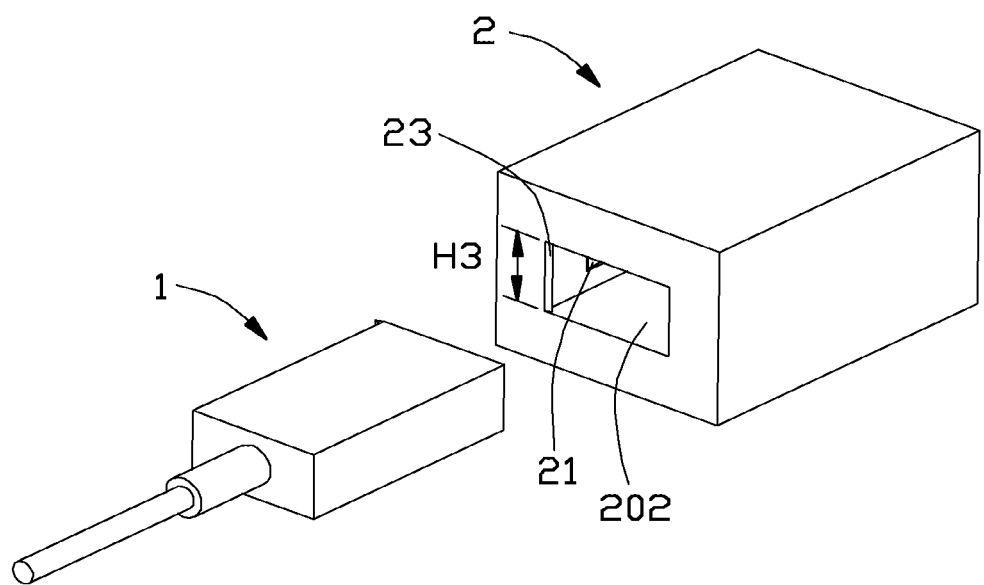
FIG. 3 is another view of the connector assembly of FIG. 1.
Figure 4:
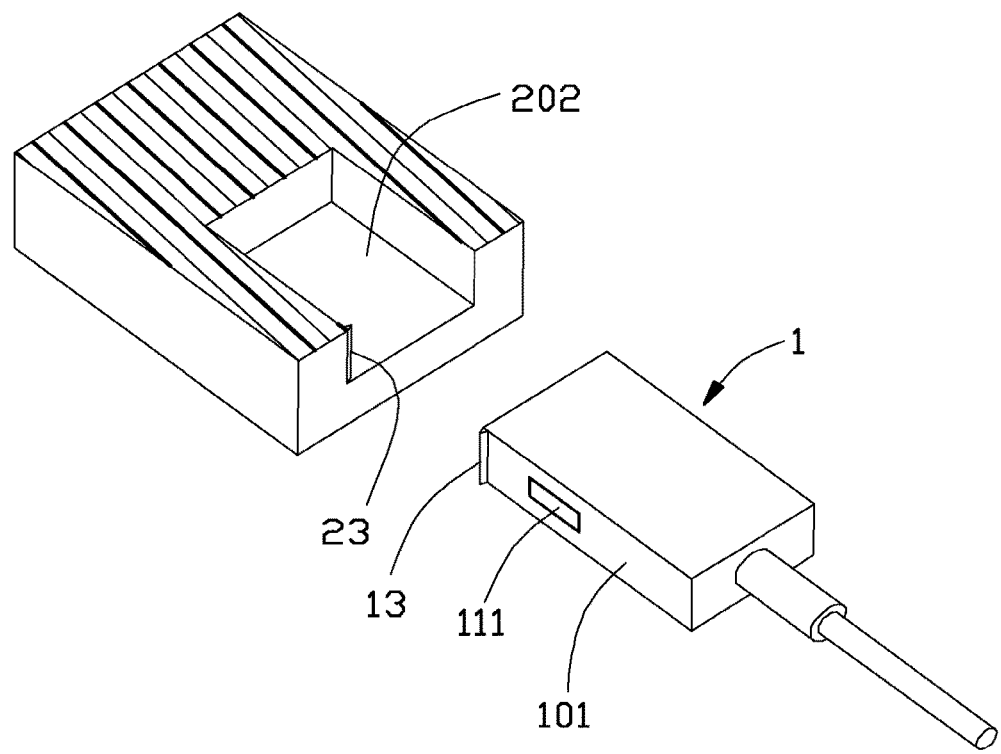
FIG. 4 is a perspective view of the connector assembly of FIG. 2, showing an upper portion of the second connector removed along line 4-4.
Figure 5:
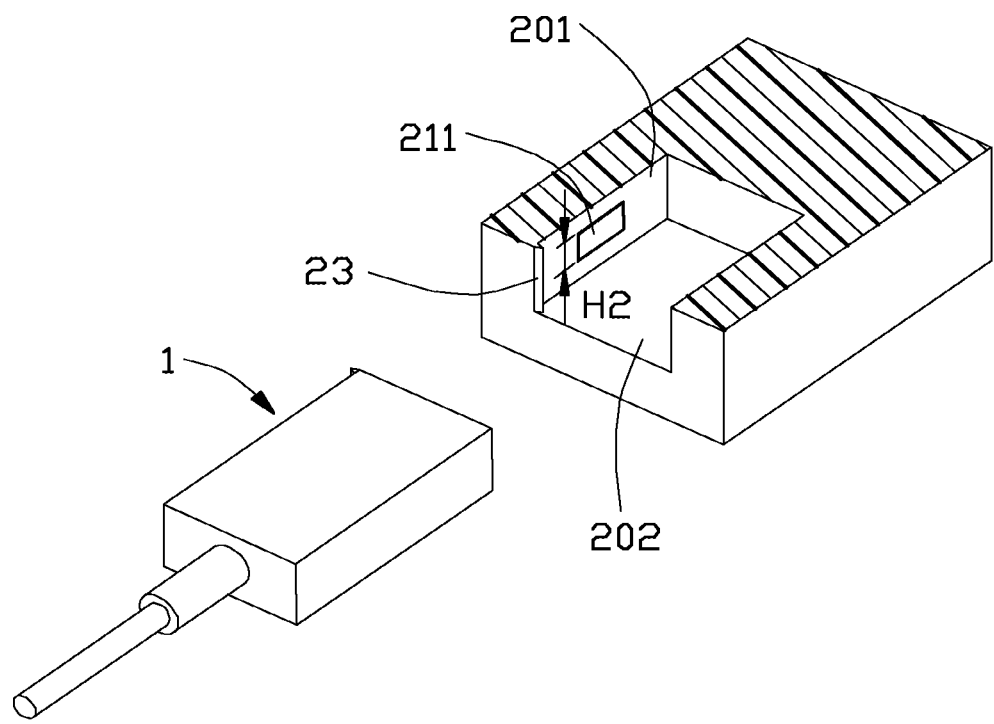
FIG. 5 is another view of the connector assembly of FIG. 4.
Figure 6:
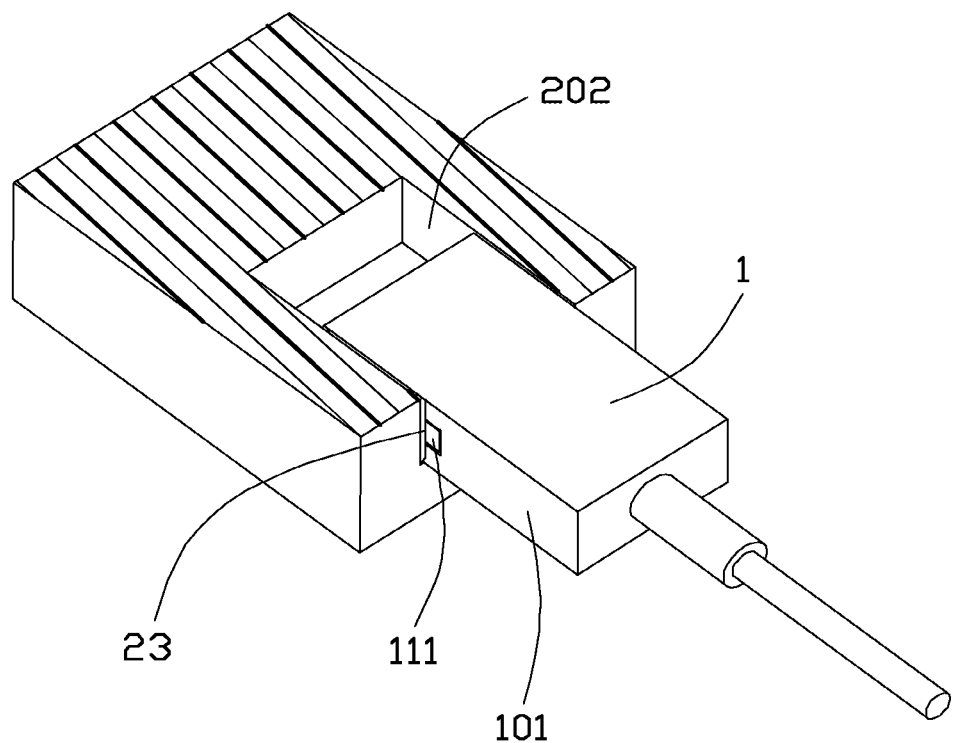
FIG. 6 shows a second cleaning device of the second connector wiping a first mating portion of the first connector while the first and second connector mating with each other.
Figure 7:
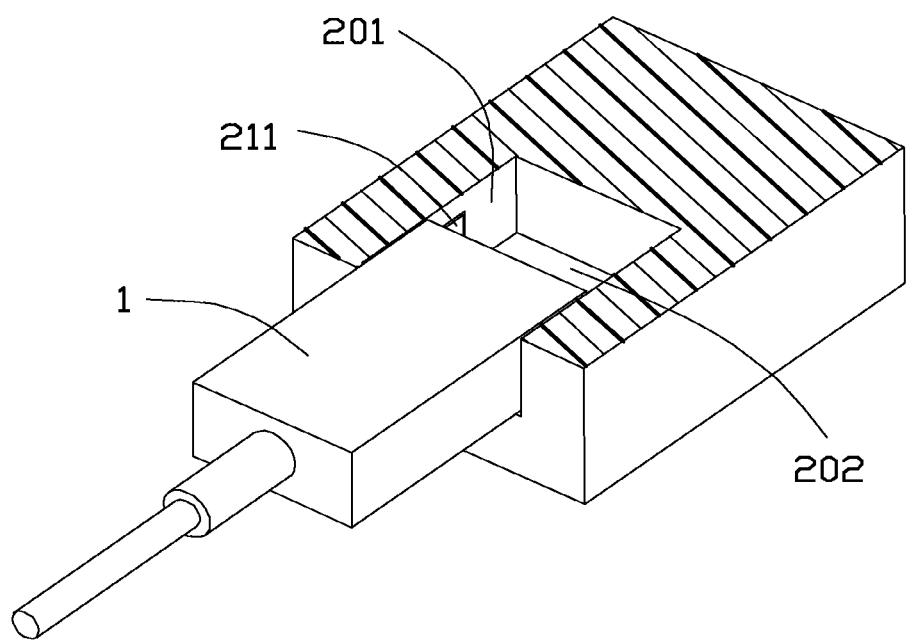
FIG. 7 is another view of the connector assembly of FIG. 6, showing a first cleaning device of the first connector wiping a second mating portion of the second connector.

Reference will now be made in detail to the preferred embodiment of the present invention.

Referring to FIG. 1 to FIG. 5, a connector assembly 100 includes a first connector 1 and a second connector 2 mated with the first connector 1, and in this embodiment, the connector assembly 100 is defined as an optical connector assembly.

The first connector 1 also can be defined as a plug connector. The first connector 1 defines a first housing 10 and a first optical element 11 retained in the first housing 10. The first housing 10 defines a first mating face 101 for mating with the second connector 2 and a first cleaning device 13 disposed at a front portion of the first mating face 101 in a mating direction. The first optical element 11 defines a stiff first mating portion 111 exposed upon the first mating face 101 and disposed behind the first cleaning device 13 in the mating direction. The first mating portion 111 and the first mating face 101 are disposed in a same planer, and the first cleaning device 13 protrudes out of the first mating face 101 and locates in front of the first mating portion 111 in the mating direction.

The second connector 2 also can be defined as a receptacle connector. The second connector 2 defines a second housing 20 and a second optical element 21 retained in the second housing 20. The second housing 20 defines a second mating face 201 disposed in a receiving cavity 202 for mating with the first mating face 101 and a second cleaning device 23 disposed at a rear portion of the second mating face 201 in the mating direction to locate adjacent to an opening of the receiving cavity 202. The second optical element 21 defines a stiff second mating portion 211 exposed upon the second mating face 201 and disposed in front of the second cleaning device 23 in the mating direction. The second mating portion 211 and the second mating face 201 are disposed in a same planer, and the second cleaning device 23 protrudes out of the second mating face 201 and locates behind the second mating portion 211 in the mating direction. The first and second mating faces 101, 201 both are parallel to the mating direction. A first height H1 of the first cleaning device 13 is larger than a second height H2 of the second mating portion 211 in a vertical direction perpendicular to the mating direction, and a third height H3 of the second cleaning device 23 is larger than a fourth height H4 of the first mating portion 111 in the mating direction.

Referring to FIG. 4 to FIG. 7, during inserting the first connector 1 into the mating cavity 202 of the second connector 2 along the mating direction, the first cleaning device 13 firstly climbs across the second cleaning device 23 and then forwardly move along the mating direction to wipe the second mating face 201 for wiping away the dirty attached to the second mating portion 211 of the second optical element 21, while the second cleaning device 23 wipes the first mating face 101 to wipe away the dirty attached to the first mating portion 111, finally the first mating portion 111 mates with the second mating portion 211 for signal transmission. The first cleaning device 13 wipes the second mating portion 211 while the second cleaning device 23 wipes the first mating portion 111 during the first connector 1 mating with the second connector 2 to respectively wipe away the dirty attached to the first and second optical elements 11, 21, which can keep the first and second optical elements 11, 21 clean to get a reliable signal transmission between the first and second connectors 1, 2. The first and second cleaning devices 13, 23 can be defined as soft brush, wiper made of elastic rubber and so on to prevent any scratch from being left on the first and second mating portions 111, 211 after the first and second optical elements 11, 21 being cleared, which is also benefit for getting a reliable signal transmission between the first and second connectors 1, 2.

Figure 8A:
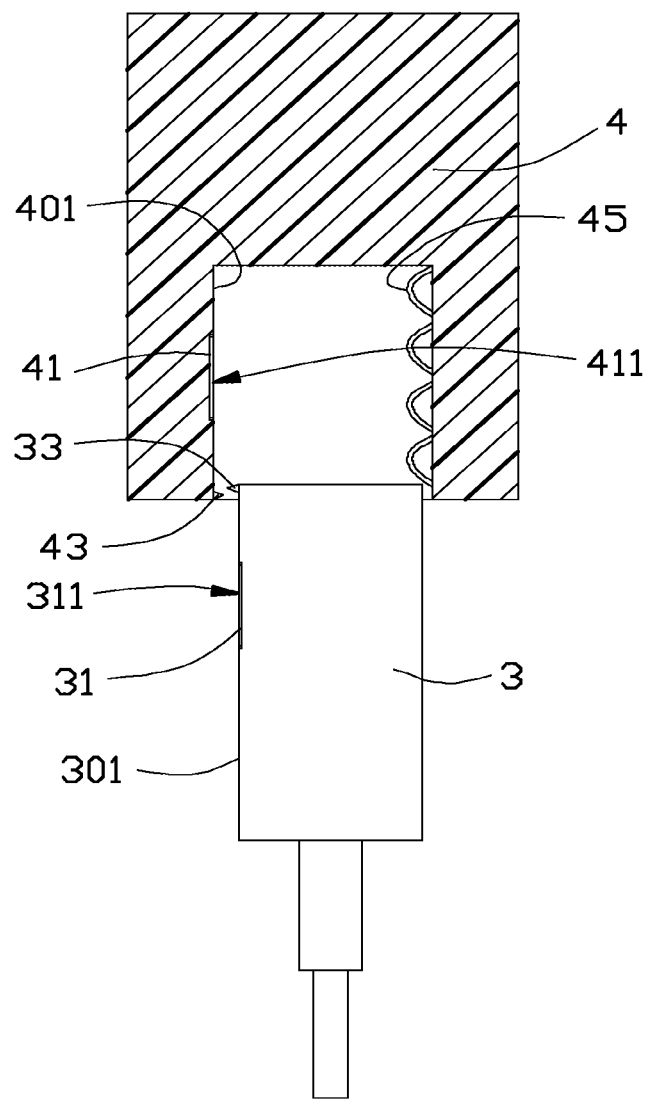
FIG. 8(A) is a cross-sectional view of an optical connector assembly including a plug connector and a receptacle according to the second embodiment of the invention wherein the plug connector is approaching the receptacle connector around the front opening thereof.
Figure 8B:
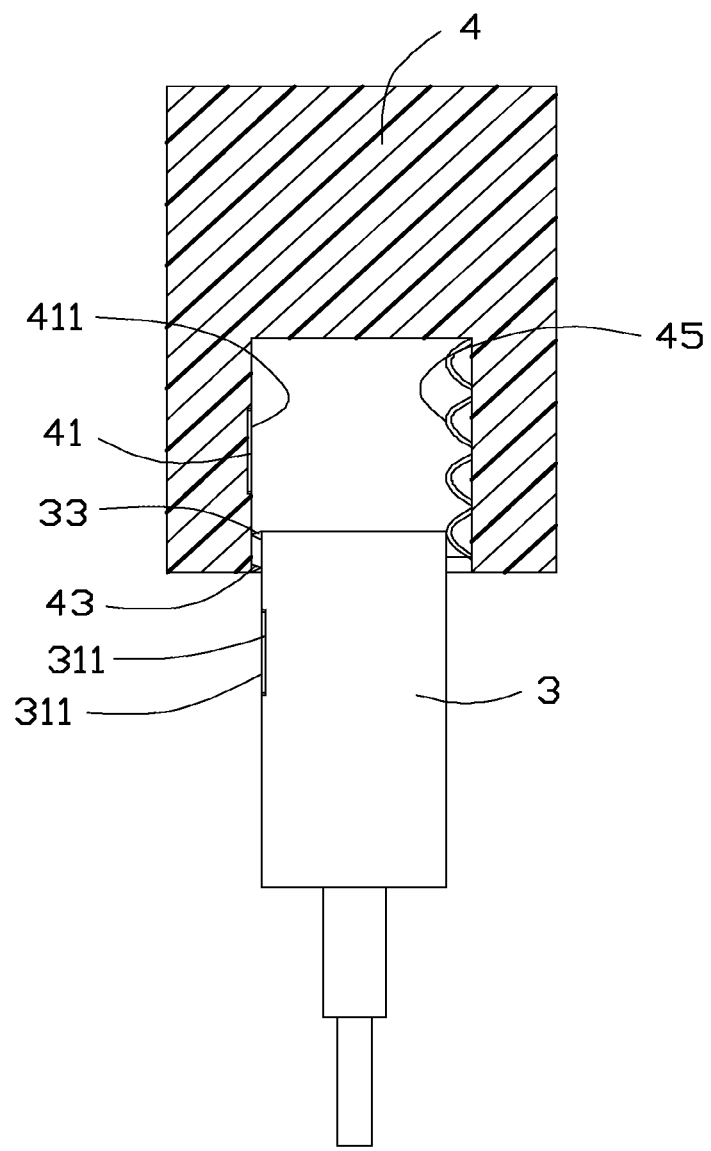
FIG. 8(B) is a cross-sectional view of the optical connector assembly of FIG. 8(A) wherein the plug connector just passes the front opening of the receptacle connector.
Figure 8C:
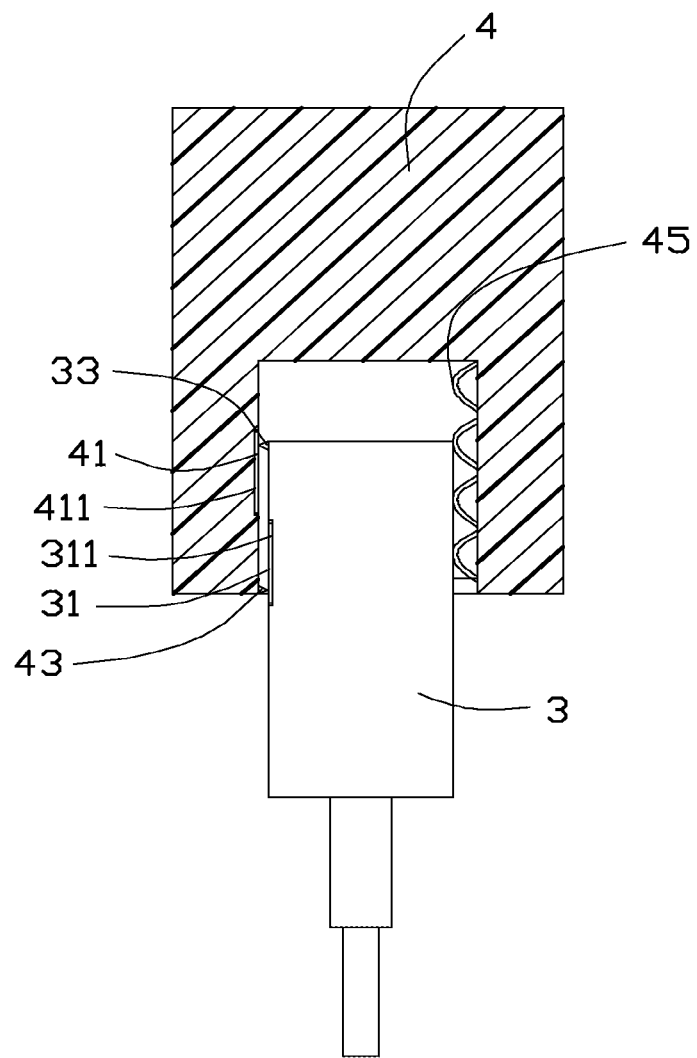
FIG. 8(C) is a cross-sectional view of the optical connector assembly of FIG. 8(A) wherein the plug connector further moves inwardly into the receptacle connector.

Referring to FIGS. 8(A)-8(C), according to another embodiment of the invention, the first connector 3 includes a first optical element 31 on the first mating face 301 with a first mating portion 311 thereon, and a first cleaning device 33 in front of the first optical element 31; the second connector 4 includes a second optical element 41 on the second mating face 401 with a second mating portion 411 thereon, and a second cleaning device 43 in front of the second optical element 41. A spring device 45 is disposed by the other side of the receiving cavity of the second connector 4 opposite to said second optical element 41. Different from the first embodiment where the width of the first connector is essentially similar to that of the receiving cavity 202, in the second embodiment the width of the first connector 3 is smaller than the receiving cavity in a width direction so as to allow the first cleaning device 33 and the second cleaning device 43 to be approached with each other in an offset manner without excessive abrasion therebetween. On the other hand, once the first cleaning device 33 passes the second cleaning device 43, the spring device 45 will force the inserted first connector 3 toward the other side of the receiving cavity to have the first cleaning device 33 sufficiently wipe the second mating portion 411 and have the second cleaning device 43 sufficiently wipe the first mating portion 311 simultaneously during further insertion of the first connector 3 into the second connector 4. Understandably, this offset arrangement in the width direction of the first connector 3 and the second connector 4, may provide the loose manufacturing tolerances for both the first connector 3 and the second connector 4 without jeopardizing the wiping action or the corresponding first cleaning device 33 and the second cleaning device 43 or resulting in excessive abrasion between the first cleaning device 33 and the second cleaning device 43, advantageously.

Figure 9A:
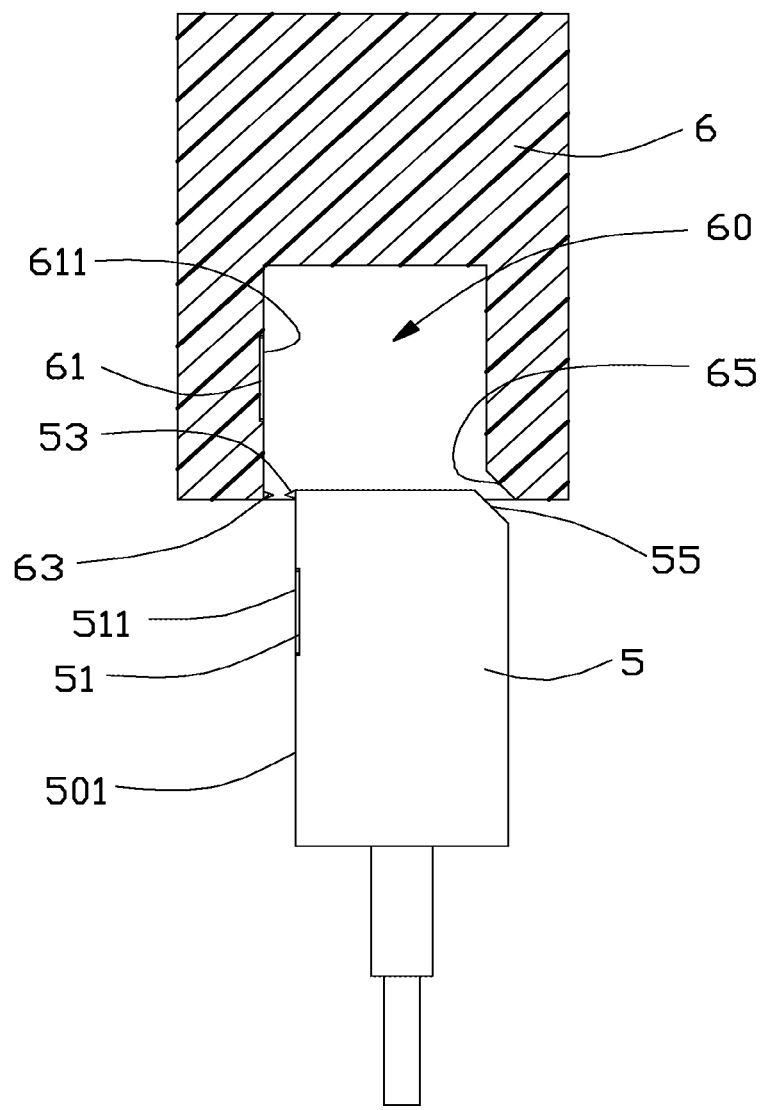
FIG. 9(A) is a cross-sectional view of an optical connector assembly including a plug connector and a receptacle according to the third embodiment of the invention wherein the plug connector is approaching the receptacle connector around the front opening thereof.
Figure 9B:
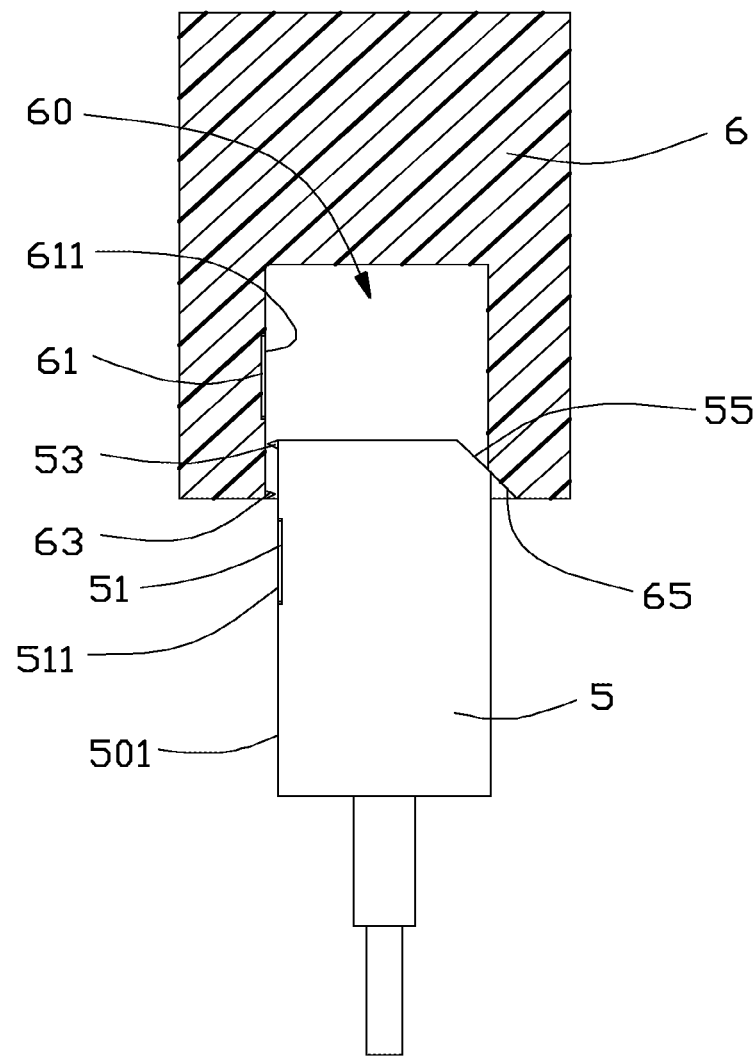
FIG. 9(B) is a cross-sectional view of the optical connector assembly of FIG. 9(A) wherein the plug connector just passes the front opening of the receptacle connector.
Figure 9C:
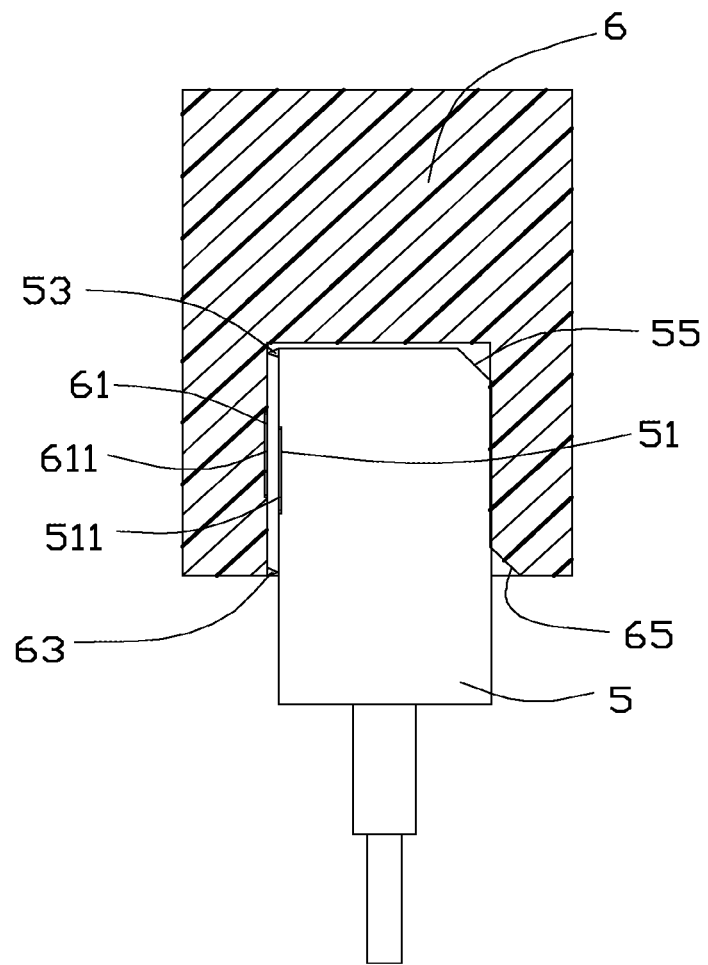
FIG. 9(C) is a cross-sectional view of the optical connector assembly of FIG. 9(A) wherein the plug connector further moves inwardly into the receptacle connector and reaches the final position.

Referring to FIGS. 9(A)-9(C), according to the third embodiment of the invention, the first connector 5 includes a first optical element 51 with a first mating portion 511 thereon and a first cleaning device 53 in front of the first optical element 51, and the second connector 6 includes a second optical element 61 with a second mating portion 611 thereon and a second cleaning device 63 in front of the second optical element 61. The dimension of the receiving cavity 60 of the second connector 6 is similar to that of the first connector 5 in the width direction except at the front opening where a chamfered structure 65 is formed. Another chamfered structure 55 is formed on the first connector 5 opposite to the first mating face 501 in the width direction to compliantly move along the chamfered structure 65 so as to prevent improper abrasion between the first cleaning device 53 and the second cleaning device 63 during the beginning stage of mating while still keeping the efficiently wiping effect during the following stage of mating.

Figure 10A:
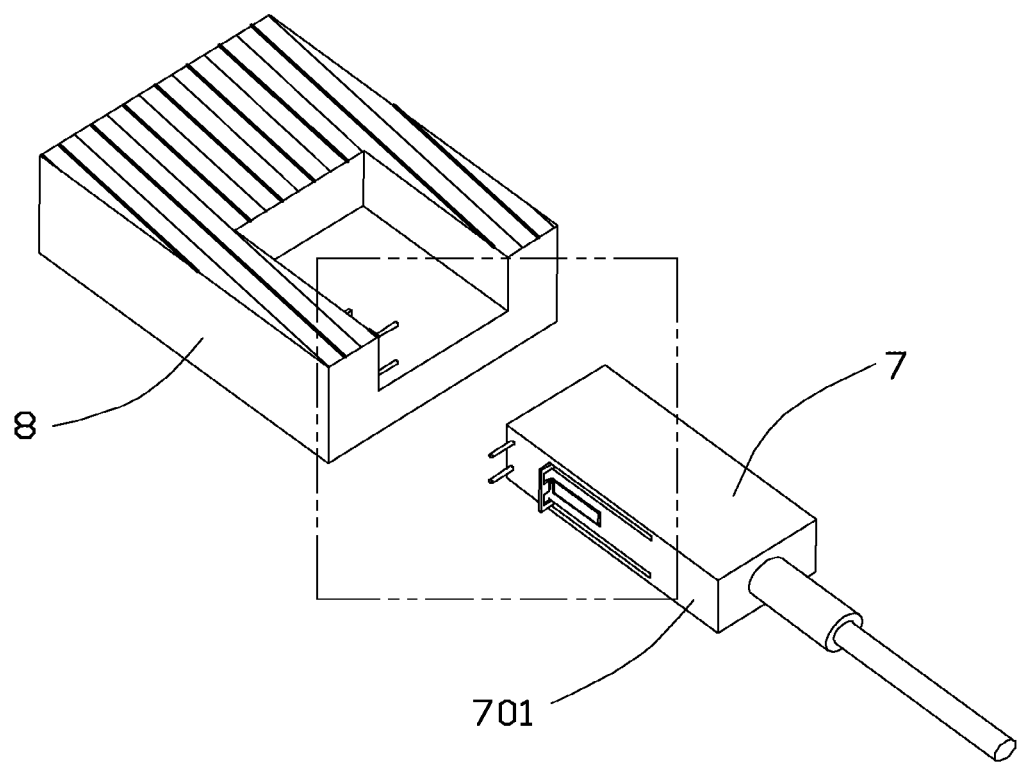
FIG. 10(A) is a perspective view of an optical connector assembly including a plug connector and a receptacle connector according to a fourth embodiment of the invention, wherein a portion of the receptacle connector is removed to expose the interior structure thereof.
Figure 10B:
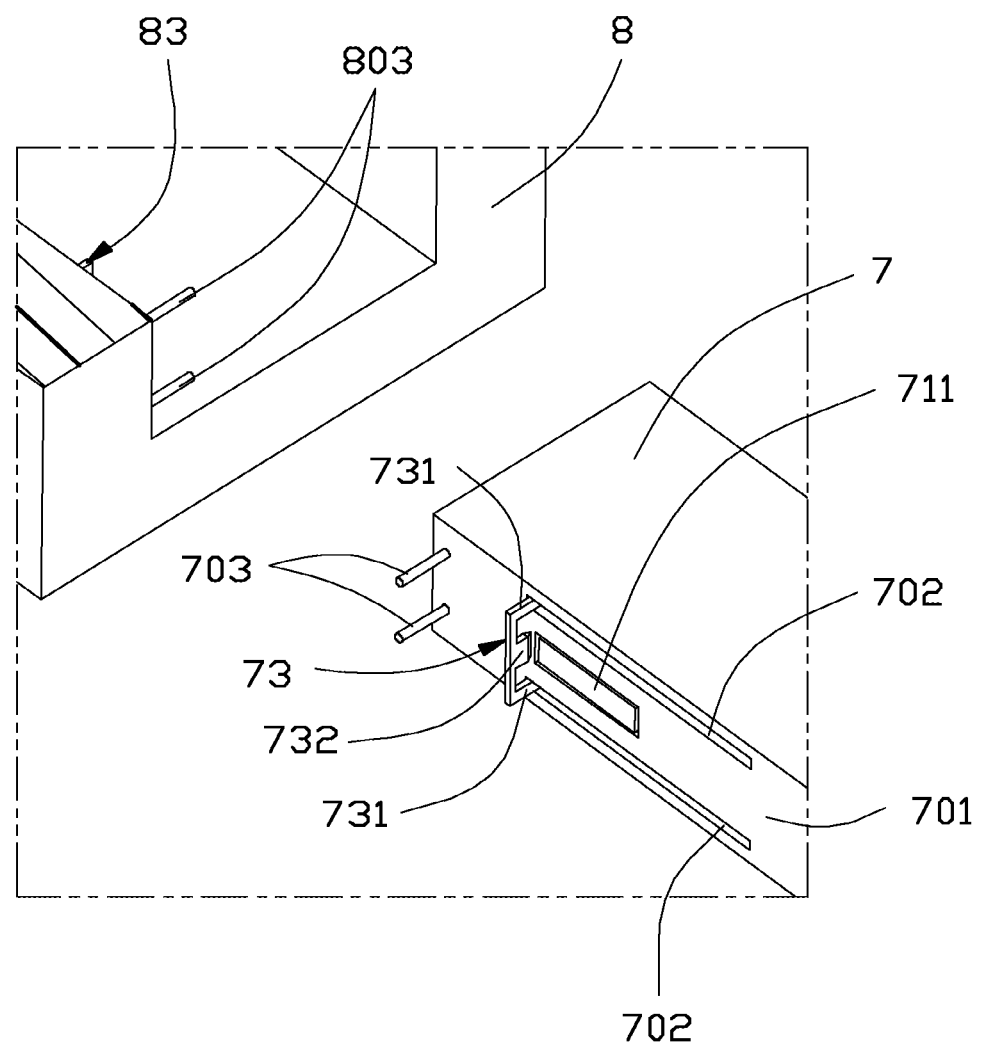
FIG. 10(B) is an enlarged view of the optical connector assembly of FIG. 10(A)
Figure 11A:
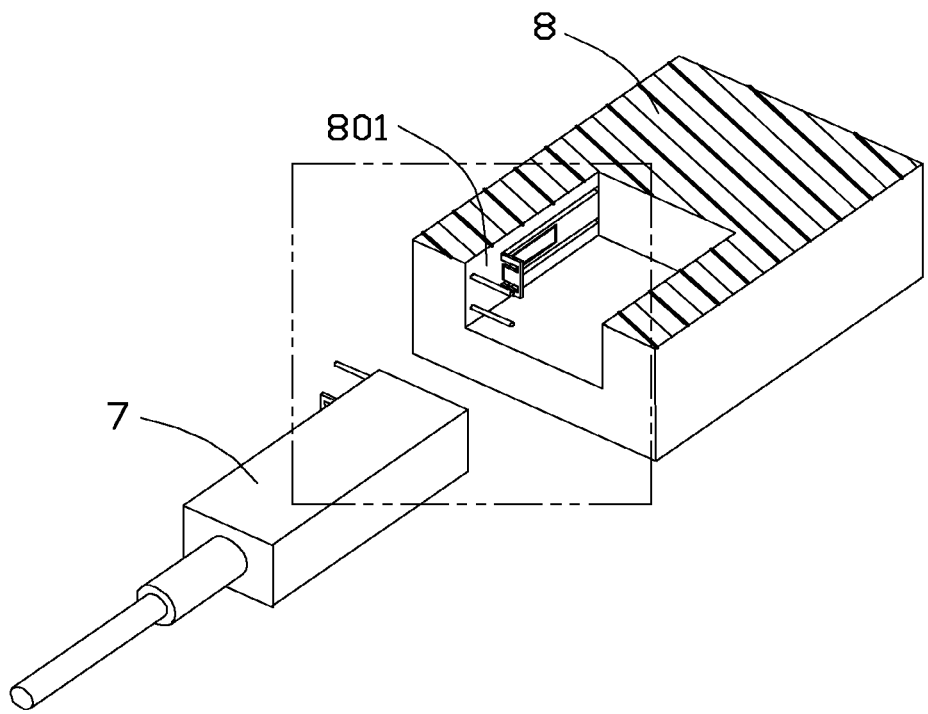
FIG. 11(A) is another perspective view of the optical connector assembly of FIG. 10(A)
Figure 11B:
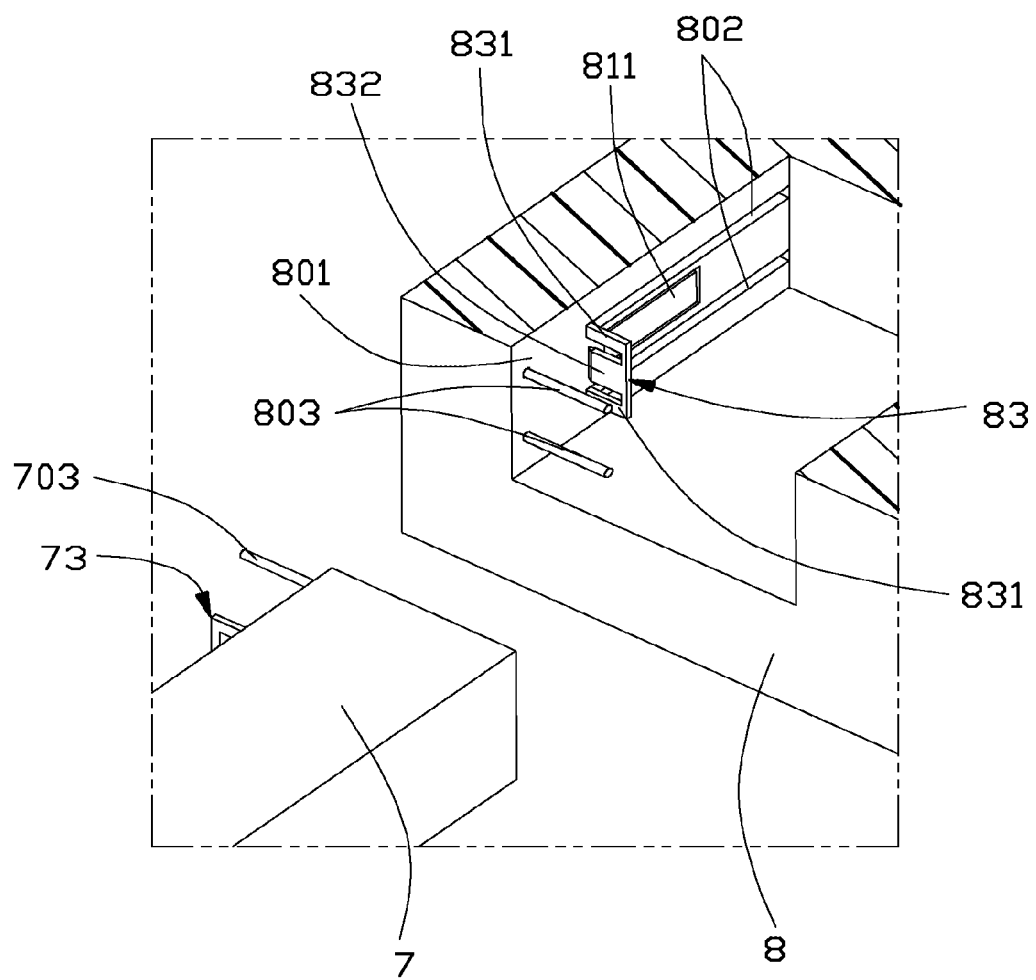
FIG. 11(B) is an enlarged view of the optical connector assembly of FIG. 11(A)
Figure 12A:
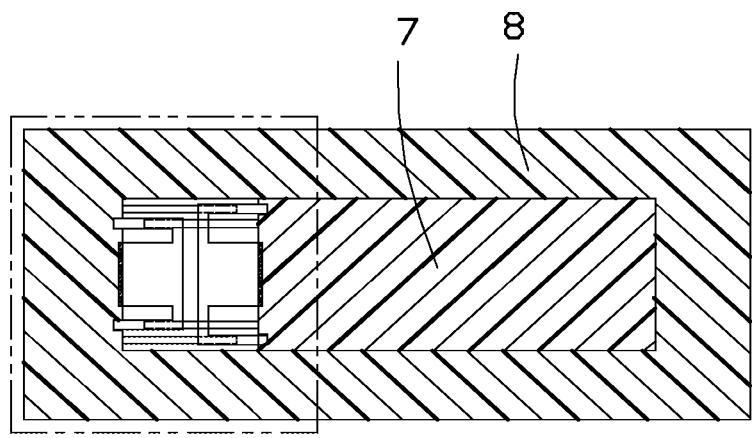
FIG. 12(A) is a cross-sectional view of the optical connector assembly of FIG. 10(A) wherein the plug connector is received within the receptacle connector.
Figure 12B:
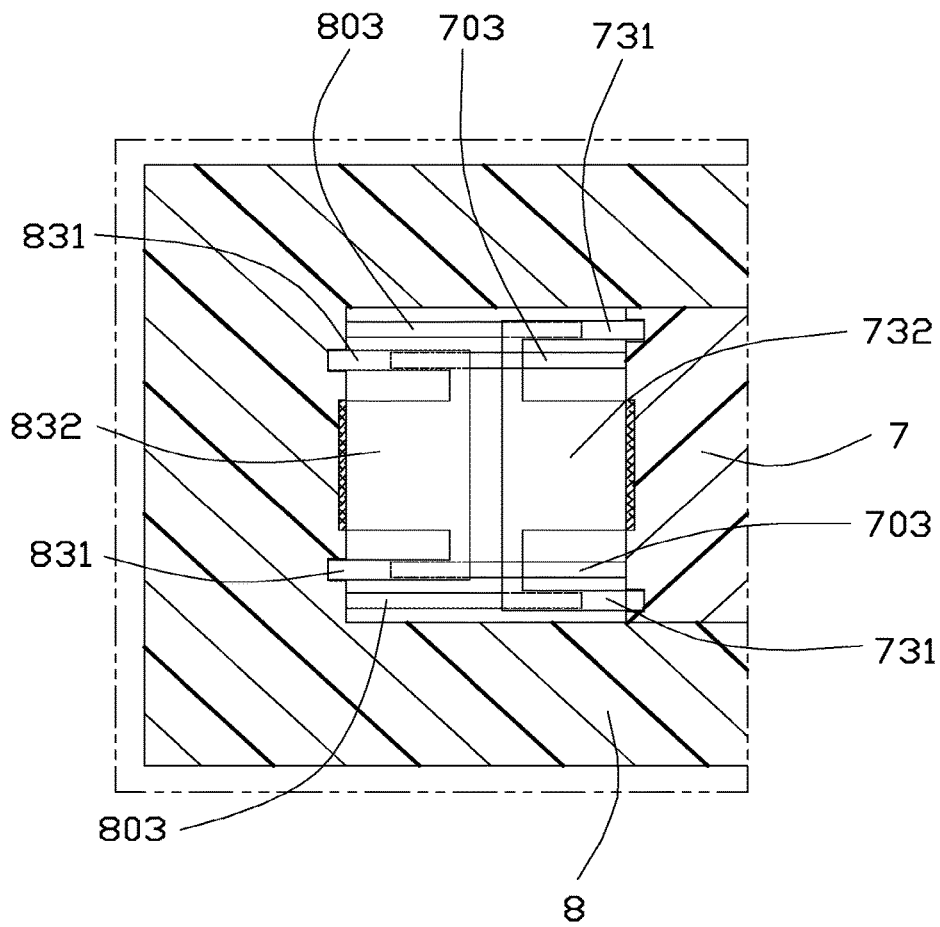
FIG. 12(B) is an enlarged view of the optical connector assembly of FIG. 12(A)

The above three embodiment all disclose the wiping action on the corresponding mating portion is performed via the corresponding stationary cleaning device of the counterpart connector during mating. Notably, as shown in both FIGS. 8(C) and 9(C), a gap (not labeled) is formed between the first mating face and the second mating face when the first connector and the second connector are fully mated with each other because the first cleaning device protrudes out of the first mating face and the second cleaning device protrudes out of the second mating face. The fourth embodiment discloses the wiping action performed by the cleaning device of the connector itself. As shown in FIGS. 10(A)-10(C), the first connector 7 includes a first optical element 71 on the first mating face 701 with a first mating portion 711 thereon. A first cleaning device 73 forms an E like structure with a pair of first legs 731 moveable along a pair of first grooves 702 in the first mating face 701, and a first wiping section 732 adapted to scrap the first mating portion 711. A pair of first pushing posts 703 are located on the first mating face 701 and in front of the first optical element 71. On the other hand, the second connector 8 includes a second optical element 81 on the second mating face 801 with a second mating portion 811 thereon. A second cleaning device 83 forms another E like structure with a pair of second legs 831 moveable along a pair of second groove 802 in the second mating face 801, and a second wiping section 832 adapted to scrap the second mating portion 811. A pair of second pushing posts 803 are located on the second mating face 801 and in front of the second optical element 81. During mating, the first cleaning device 73 is urged to move backwardly by the pair of second pushing posts 803 so as to have the corresponding first wiping section 732 scrap the first mating portion 711, and the second cleaning device 83 is urged to move backwardly by the pair of first pushing posts 703 so as to have the corresponding second wiping section 832 scrap the second mating portion 811. Compared with the other embodiments using a stationary cleaning device to wipe the optical element of the counterpart connector, the instant embodiment is to use a moveable cleaning device of the subject connector to wipe its own optical element. In addition, in this embodiment the space between the first mating face 701 and the second mating face 801 in the width direction is relatively larger than that disclosed in the previous embodiments so as to allow the corresponding pushing posts to be located and the corresponding cleaning devices to move along the mating direction. Understandably, the cleaning device is equipped with a resilient device (not shown) to urge the cleaning device forwardly so as to assure the cleaning device is resumed to the front position once the mated connector is removed, thus assuring the wiping action occurrence during every time mating. Under this situation, an additional latch structure is required to fasten the mated first and second connectors together, as used in some traditional electrical connector assembly, for resisting the spring forces. On the other hand, to minimize the space between the opposite first and second mating faces, the first pushing posts of the first connector may extend into the second grooves of the second connector as long as the second groove extend forwardly to the front end of the second connector, and the second pushing posts of the second connector may extend into the first grooves of the first connector as long as the first grooves extend forwardly to the front end of the first connector.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A connector assembly including a first connector and a second connector mating with the first connector in a mating direction for signal transmission, the first connector comprising:
   a first mating face and a first cleaning device disposed in the first mating face; and
   a stiff first mating portion exposed upon the first mating face and located behind the first cleaning device in the mating direction;
   the second connector comprising: a second mating face and a second cleaning device disposed in the second mating face; and
   a stiff second mating portion exposed upon the second mating face and located in front of the second cleaning device in the mating direction; wherein
   during mating the first connector to the second connector along the mating direction, the first cleaning device wipes the second mating face for wiping away dust attached to the second mating portion while the second cleaning device wipes the first mating face for wiping away dust attached to the first mating portion until the first and second mating portions mated with each other; wherein
   the first cleaning device protrudes out of the first mating face and the second cleaning device protrudes out of the second mating face so as to form a gap formed between the first mating face and the second mating face when the first connector and the second connector are fully mated with each other.

2. The connector assembly as claimed in claim 1, wherein the first and second mating faces both are parallel to the mating direction.

3. The connector assembly as claimed in claim 1, wherein the first mating portion and the first mating face are disposed in a same plane.

4. The connector assembly as claimed in claim 1, wherein the second connector defines a second housing having a receiving cavity for receiving the first connector therein, the second mating face is disposed in the receiving cavity and the second cleaning device is located adjacent to an opening of the receiving cavity.

5. The connector assembly as claimed in claim 4, wherein the second mating portion and the second mating face are disposed in a same plane.

6. The connector assembly as claimed in claim 1, wherein a first height of the first cleaning device is larger than a second height of the second mating portion in a vertical direction perpendicular to the mating direction, while a third height of the second cleaning device is larger than a fourth height of the first mating portion in the vertical direction.

7. The connector assembly as claimed in claim 1, wherein both the first cleaning device and the second cleaning device are defined as soft brush.

8. The connector assembly as claimed in claim 1, wherein both the first cleaning device and the second cleaning device are defined as wiper made of elastic rubber.

9. A connector assembly comprising:
   a first connector forming a first mating face with a first optical element thereon, said first optical element defining a first mating portion thereon;
   a first cleaning device located on the first mating face and in front of the first optical element along a mating direction;
   a second connector forming a receiving cavity to receive the first connector therein in said mating direction, and defining internally a second mating face exposed to said receiving cavity in a lateral direction perpendicular to said mating direction and facing toward the first mating face during mating;

a second optical element located upon the second mating face with a second mating portion thereon; and a second cleaning device located on the second mating face and in front of the second optical element in said mating direction; wherein the first connector and the second connector are structured to have the first cleaning device and the second cleaning device offset away from each other in a lateral direction without excessive abrasion therebetween during an initial stage of mating while being urged toward each other in a successive stage during mating to have the first cleaning device efficiently wipe the second mating portion and the second cleaning device efficiently wipe the first mating portion; wherein the first cleaning device protrudes out of the first mating face and the second cleaning device protrudes out of the second mating face so as to form a gap formed between the first mating face and the second mating face in the lateral direction when the first connector and the second connector are fully mated with each other.

10. The connector assembly as claimed in claim 9, wherein a width of the first connector is smaller than that of the receiving cavity, and one of said first connector and said second connector is equipped with a spring device to urge the first connector to move in a lateral direction to have the first mating face and the second mating face confront each other with said gap therebetween when the first connector and the second connector are fully mated with each other.

11. The connector assembly as claimed in claim 10, wherein said spring device is disposed in the second connector, and the spring device and the second cleaning device are located by two opposite sides of receiving cavity in the lateral direction, respectively.

12. The connector assembly as claimed in claim 9, wherein the first cleaning device is located at a front end of the first connector, and the second cleaning device is located at a front end of the second connector.

13. The connector assembly as claimed in claim 12, wherein at least a chamfered structure is formed at either the front end of the first connector or the front end of the second connector so as to have the first cleaning device and the second cleaning device offset away from each other in the lateral direction for avoiding excessive abrasion.

14. The connector assembly as claimed in claim 13, wherein a width of the first connector in the lateral direction is smaller than that of the receiving cavity so as to have the first mating face and the second mating face confront each other with said gap therebetween when the first connector and the second connector are fully mated together.

15. A connector assembly comprising:
a first connector adapted to be mated with a second connector along a mating direction, said first connector including:

a first mating face exposed in a first lateral direction perpendicular to said mating direction;

a first optical element disposed upon the first mating face with a first mating portion thereon;

a first cleaning device disposed upon the first mating face, located in front of the first mating portion and backwardly moveable along said mating direction;

the second connector including:

a second mating face exposed in a second lateral direction opposite to said first lateral direction;

a second optical element disposed upon the second mating face with a second mating portion thereon for confronting the first mating portion during mating; and at least a pushing post urging the first cleaning device to move backward in a direction opposite to the mating direction during mating to wipe the first mating portion; wherein the first cleaning device protrudes out of the first mating face and the second cleaning device protrudes out of the second mating face so as to form a gap formed between the first mating face and the second mating face along either one of the first lateral direction and the second lateral direction when the first connector and the second connector are fully mated with each other.

16. The connector assembly as claimed in claim 15, wherein said pushing post is immoveable in said mating direction.

17. The connector assembly as claimed in claim 15, wherein said second connector further includes a second cleaning device located in front of the second mating portion and moveable along the mating direction, and the first connector further includes at least another pushing post to urge the second cleaning device to move backward for wiping the second mating portion during mating.

18. The connector assembly as claimed in claim 17, wherein in the first connector, said another pushing post is located in front of the first cleaning device in the mating direction, and in the second connector said pushing post is located in front of the second cleaning device in the mating direction.

19. The connector assembly as claimed in claim 18, wherein the pushing post of second connector and said another pushing post of the first connector are not aligned with each other in the mating direction but offset from each other in a vertical direction perpendicular to both said mating direction and said first lateral direction.

20. The connector assembly as claimed in claim 15, wherein the first cleaning device includes a pair of first legs moveable along a pair of corresponding first grooves in said mating direction, and a first wiping section located between the pair of first legs in a vertical direction perpendicular to both said mating direction and said first lateral direction, and confronting the first mating portion in said second lateral direction.

* * * * *